(12) United States Patent
Li et al.

(10) Patent No.: US 9,900,402 B1
(45) Date of Patent: Feb. 20, 2018

(54) CAPACITY-INDEPENDENT DEMAND ASSESSMENT

(71) Applicant: Amazon Technologies, Inc., Seattle, WA (US)

(72) Inventors: Xiao Yu Li, Seattle, WA (US); Yibo Jiao, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 247 days.

(21) Appl. No.: 14/565,042

(22) Filed: Dec. 9, 2014

(51) Int. Cl.
*H04L 12/24* (2006.01)
*H04L 29/08* (2006.01)

(52) U.S. Cl.
CPC .......... *H04L 67/32* (2013.01); *H04L 41/0896* (2013.01); *H04L 67/1008* (2013.01); *H04L 67/26* (2013.01)

(58) Field of Classification Search
CPC ..................... H04L 61/1511; H04L 41/0896
See application file for complete search history.

(56) References Cited

U.S. PATENT DOCUMENTS

| | | | | |
|---|---|---|---|---|
| 7,457,240 B2 * | 11/2008 | Oki | ................. | H04L 43/00 370/230 |
| 7,716,367 B1 * | 5/2010 | Leighton | ........... | H04L 29/12066 709/226 |
| 7,962,597 B2 * | 6/2011 | Richardson | ....... | H04L 29/12066 709/203 |
| 7,991,910 B2 * | 8/2011 | Richardson | ....... | H04L 29/12066 709/203 |
| 8,028,090 B2 * | 9/2011 | Richardson | ....... | H04L 29/12066 709/203 |
| 8,156,243 B2 * | 4/2012 | Richardson | ........... | H04L 61/301 709/217 |
| 8,468,247 B1 * | 6/2013 | Richardson | ............. | H04L 67/18 370/329 |
| 8,521,885 B1 * | 8/2013 | Richardson | ........... | H04L 67/327 709/226 |
| 8,732,309 B1 * | 5/2014 | Richardson | ....... | G06F 17/30893 709/223 |
| 8,756,341 B1 * | 6/2014 | Richardson | ......... | H04L 67/2814 370/351 |

(Continued)

*Primary Examiner* — Jimmy H Tran
(74) *Attorney, Agent, or Firm* — Knobbe, Martens, Olson & Bear, LLP (57) ABSTRACT

Systems and methods are described to enable assessment of demand for points of presence (POPs) within a content delivery system, independent of the capacity of such POPs. The content delivery system can utilize load balancing technology to distribute user requests for content to various POPs, based at least partly on the capacity of the POPs. Because load balancing generally occurs prior to a user's connection to a POP, the monitored load of individual POPs may not accurately reflect user demand for the individual POPs services. Accordingly, systems and methods are disclosed to correlate pre-load-balancing requests, such as DNS requests, with post-load-balancing demand levels. Thereafter, the determined correlation can be utilized to assess user demand for individual POPs, independent of the observed load on that individual POP. In some instances, POPs or other network components can be clustered to determine capacity-independent demand for a collection of POPs.

20 Claims, 5 Drawing Sheets

(56) References Cited

U.S. PATENT DOCUMENTS

| | | | |
|---|---|---|---|
| 8,819,209 B1* | 8/2014 | Chen | H04L 61/1511 709/223 |
| 8,819,283 B2* | 8/2014 | Richardson | H04L 29/12066 709/226 |
| 8,886,742 B2* | 11/2014 | Crowe | H04L 67/2847 709/213 |
| 8,954,491 B1* | 2/2015 | Medved | H04L 45/02 709/201 |
| 9,003,035 B1* | 4/2015 | Richardson | H04L 61/10 709/224 |
| 9,083,743 B1* | 7/2015 | Patel | H04L 61/1511 |
| 9,137,301 B1* | 9/2015 | Dunlap | H04L 67/101 |
| 2003/0135645 A1* | 7/2003 | Oki | H04L 43/00 709/238 |
| 2011/0153736 A1* | 6/2011 | Sivasubramanian | H04L 29/12132 709/203 |
| 2012/0198075 A1* | 8/2012 | Crowe | H04L 67/2847 709/226 |
| 2012/0314575 A1* | 12/2012 | Frank | H04L 41/0896 370/235 |
| 2014/0059198 A1* | 2/2014 | Richardson | H04L 61/1511 709/223 |
| 2014/0359041 A1* | 12/2014 | Bai | H04L 61/6013 709/207 |
| 2014/0373148 A1* | 12/2014 | Nelms | H04L 63/1441 726/23 |
| 2015/0081926 A1* | 3/2015 | White | H04L 67/1008 709/245 |

* cited by examiner

CAPACITY-INDEPENDENT DEMAND ASSESSMENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Existing routing and addressing technologies can enable multiple data centers to provide similar or identical content to client computing devices. In some instances, each data center providing a set of content may be referred to as a point-of-presence ("POP") for a content delivery system (or other organization) providing the content. Content delivery systems often prefer to connect users to a geographically-nearby POP, as such connections are commonly quicker and more reliable than connections between a user and a geographically-distant POP. Accordingly, a content delivery system can maintain POPs over a wide area (or worldwide). Thereafter, requests for content from the content delivery system can be routed to a nearby POP for fulfillment.

In some instances, geographic proximity may not be the only criterion used to route a user request to a POP. Illustratively, POPs within a content delivery system may have limited capacity, such that not all users near a POP can be served content simultaneously. In instances where the load of requests serviced by a POP exceeds a desired amount, the content delivery system may utilize load balancing techniques to route requests to a more geographically-distant or otherwise less preferred POP.

DETAILED DESCRIPTION

Generally described, aspects of the present disclosure relate to assessing user demand for individual points of presence ("POPs"), or groups of POPs, independent of the demand load experience at the individual POP. Individual POPs within a content delivery system can service user requests for content based on capacity-independent criteria, such as geographic location or network connectivity speed. However, each POP may also have limited capacity to service user requests. Therefore, the content delivery system may utilize load-balancing techniques to ensure that individual POPs are not overloaded with requests. This load-balancing can result in user requests being routed to an alternate POP than would be selected independent of capacity constraints. Accordingly, the historical amount of user requests serviced by a POP may not accurately reflect the user requests that would, absent capacity restraints, be routed to the POP. Current systems may utilize historical demands for an individual POP to forecast future demand to that POP, which is then used to modify future deployment or maintenance of POPs. Thus, inaccuracies in historical POP demand can be perpetuated into future demand forecasts, and result in inaccurate placement and maintenance of POPs. Accordingly, there exists a need for systems and methods to determine demand loads on POPs, independent of the capacity of the POP.

One problem with attempting to assess capacity-independent demand levels is that the information used to load-balance requests for content is not generally received directly from the user devices. Rather, load-balancing often occurs at the time of domain name resolution for the content. As described in more detail below, domain name resolution requests are commonly passed through a recursive domain name system (DNS), which in many implementations does not allow a final domain name server (e.g., a load-balancing server) to identify the source of the domain name resolution request. Therefore, it can be problematic to determine whether requests for content (occurring after domain name resolution) are a result of capacity-independent criteria (e.g., location or network latency) or rather the result of load-balancing.

At least some embodiments of the present disclosure address the above issues by enabling post-load-balancing demand load (e.g., as created by requests for content received from user computing devices) to be attributed to domain name resolution servers, which generate pre-load-balancing requests for content. Moreover, the present disclosure enables a capacity-independent POP to be determined for each domain name resolution server. Thus, by aggregating the post-load-balancing demand load for each domain name resolution server associated with a given POP, the capacity-independent demand load for the POP can be determined. This demand load can then be used to generate a capacity-independent demand forecast for the POP, enabling more accurate prediction of future resource use of the POP and more efficient creation and location of POPs.

To further illustrate, in a non-limiting manner, the indirect relationship between domain name resolution requests (used to conduct load-balancing on a content delivery system) and subsequent demand load on a POP, consider an instance in which a user requests from a content delivery service a specific content item located at the URL "www.cdn.tld/contentitem." In order to retrieve the content item, the user's computing device must first resolve the hostname "www.cdn.tld" included within the URL into a network address (e.g., the IPv4 address "10.0.1.1," the IPv6 address "fc00:0:0:0:0:0:0:1", etc.). The user's computing device therefore sends a resolution request to a server within a domain name system (DNS). Generally described, a domain name system can include a hierarchy of computing devices configured to maintain information mapping hostnames to one or more network addresses, and to use such information to service requests to resolve hostnames into network addresses. A device, such as a user computing device, that requests information from a domain name system can be referred to as a DNS resolver. Often, requests from DNS resolvers are fulfilled by recursive transmission through the domain name system. For example, where a first DNS server is unable to resolve a hostname into a network address directly, the first DNS server may request information from a second DNS server. Each DNS server can thereafter request information from subsequent DNS servers, until a network address of the hostname is located (or the request fails). When requesting information from other DNS servers, a requesting DNS server may itself be considered a DNS resolver.

Returning to the example above, a user's computing device may attempt to resolve the URL "www.cdn.tld/contentitem," into a network address by transmitting a request to an initial DNS server (e.g., selected according to the configuration of the user's computing device and often associated with an internet service provider (ISP) of the user). The initial DNS server may then act as a DNS resolver, transmitting the request through the domain name system, until the request is received at a final DNS server with knowledge of an IP address corresponding to the hostname "www.cdn.tld." For the purposes of this example, it is assumed that the request is routed to a load-balancing DNS server associated with the content delivery system. This final DNS server can then resolve the request into an IP address of a POP serving the content. Resolution of the request can be based on capacity-independent factors (e.g., such that a selected POP is the preferred POP to serve the request, absent capacity constraints), as well as capacity-dependent factors (e.g., whether the otherwise preferred POP has capacity to serve the request). After the DNS server at the content delivery system successfully resolves the request, a resultant IP address of the selected POP is transmitted back through the domain name system to the initial DNS server and subsequently to the user's computing device. Because of the use of the domain name system, the identity of the originally requesting user is unknown to the content delivery system. After receiving the IP address of a POP, the user's computing device may establish an IP connection with the POP, to retrieve the content item. Because this connection generally identifies the user's computing device, the content delivery system may attribute the resulting load on the POP to the user's device. However, because the hostname resolution request discussed above does not also identify the user's computing device, the content delivery system may be unable to determine whether the observed load is a result of capacity-independent POP selection, or a result of load-balancing.

One solution to this problem is to attribute demand load from user computing devices to specific domain name resolvers. A domain name resolver can generally refer to the domain name server that interacts with the content delivery system to resolve a specific hostname. For example, a domain name resolver may be a domain name server of the user's computing device (e.g., as provided by the user's ISP). In order to accurately attribute demand load to domain name resolvers, web beacons can be utilized among a select set of user computing devices, in order to correlate the user computing devices to domain name servers. As used herein, a web beacon is a broad term having its ordinary meaning, and in some embodiments refers to a specialized content item on a content delivery system that may be used to track requests for the content item through both domain name resolution and subsequent retrieval. In one embodiment, a web beacon may be a small and invisible content item, such as a transparent pixel within a hypertext markup language ("HTML") document. The web beacon can be associated with a unique location on the content delivery system, such that retrieval of the web beacon requires an identifiable domain name resolution request be transmitted to the content delivery system. For example, the web beacon may be associated with the URL "beacon1.cdn.tld/myBeacon.gif." This URL may be placed, for example, within an HTML page delivered to a user's computing device by the content delivery system. Thereafter, when the user's computing device loads the web beacon, a domain name resolution request for "beacon1.cdn.tld" would be transmitted to the content delivery system by a domain name resolver associated with the user. Because the domain name may be selected by the content delivery system as unique, the content delivery system can determine that the domain name resolver that transmitted the request is associated with the user computing device that received the URL of web beacon. Thus, the domain name resolver can be correlated to the user's computing device. Thereafter, any demand load created by the user's computing device can be attributed to the domain name resolver.

As described below, web beacons may be transmitted to a large and statistically significant group of a user's computing devices, such that a large portion of the demand load for a set of POPs may be correlated to domain name resolvers. In some instances, known relationships between a specific user computing device and POP (e.g., determined by use of a web beacon) can be used to infer relationships between that POP and other user computing devices. For example, where a web beacon has been used to correlate a first user computing device and a first POP, the content delivery system may infer that any additional user computing devices within the same network (e.g., within the same sub-domain) are also associated with the first POP. Illustratively, this association may reflect that all user computing devices within the same sub-domain are associated with a single ISP, and therefore utilize the same or similar domain name resolvers. In this manner, large portions of user computing devices can be associated with POPs, without requiring web beacons to be sent to each computing device.

Subsequently, the content delivery system can monitor the demand load on various POPs created by the user computing devices. By virtue of the determined relationships between user computing devices and domain name resolvers, the demand of each user computing device can be attributed to the domain name resolvers. As will be discussed, the content delivery system can thereafter determine a POP to which requests from the domain name resolver would be directed, given no capacity constraints. In one embodiment, a domain name resolver may be associated with a POP based at least in part on capacity-independent criteria, such as an expected latency between the domain name resolver and the POP. Thereafter, demand loads attributed to each domain name resolver associated with a specific POP can be aggregated to determine a capacity-independent demand load for the POP. This demand load can then be used to generate a capacity-independent demand forecast for the POP, enabling more accurate prediction of future resource use of the POP and more efficient creation and location of POPs.

While the above description generally relates to determining capacity-independent demand loads for individual POPs, aspects of the present disclosure may also determine capacity-independent demand loads for groupings of POPs. In one embodiment, groups of POPs may be determined based at least in part on cluster analysis of POPs. For example, POPs may be grouped together based on various network or physical metrics, such as latency, bandwidth, hop count, packet loss, or path reliability network distance, or geographical proximity to user computing devices. Further details regarding clustering of POPs are provided below.

Figure 1:
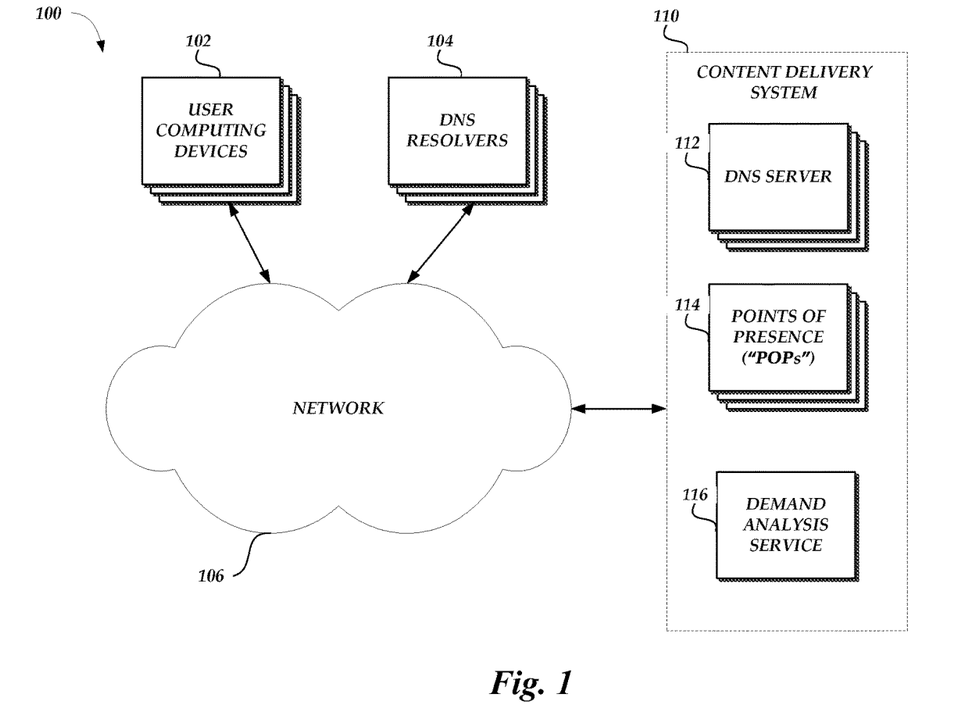
FIG. 1 is a block diagram depicting an illustrative logical network 100 including multiple user computing devices and domain name system (DNS) resolvers, as well as a content delivery system 110 including multiple points-of-presence.

FIG. 1 is a block diagram depicting an illustrative logical network 100 including multiple user computing devices 102 and multiple DNS resolvers 104 in communication with a content delivery system 110 via a network 106. While the user computing devices 102 and the DNS resolvers 104 are shown as a group within FIG. 1, the user computing devices 102 and DNS resolvers 104 may be geographically distant, and independently owned or operated. For example, the user computing devices 102 could represent a multitude of users in various global, continental, or regional locations accessing the content delivery system 110. Further, the DNS resolvers 104 could represent a multitude of DNS devices operating globally, continentally or regionally. Accordingly, the groupings of user computing devices 102 and DNS resolvers 104 within FIG. 1 is intended to represent a logical, rather than physical, grouping. Similarly, each of the components of the content delivery system 110 may be located within geographically diverse areas. For example, the DNS servers 112 and POPS 114 within the content delivery system may be globally, continentally, or regionally disparate, in order to provide a wide geographical presence for the content delivery system 110.

Network 106 may be any wired network, wireless network or combination thereof. In addition, the network 106 may be a personal area network, local area network, wide area network, cable network, satellite network, cellular telephone network, or combination thereof. In the example environment of FIG. 1, network 106 is a global area network (GAN), such as the Internet. Protocols and components for communicating via the other aforementioned types of communication networks are well known to those skilled in the art of computer communications and thus, need not be described in more detail herein. While each of the user computing devices 102, DNS resolvers 104, and content delivery system 110 are depicted as having a single connection to the network 106, individual components of the user computing devices 102, DNS resolvers 104, and content delivery system 110 may be connected to the network 106 at disparate points. Accordingly, communication times and capabilities may vary between the components of FIG. 1.

User computing devices 102 may include any number of different computing devices capable of communicating with the content delivery system 102. For example, individual user computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each user computing device 102 may utilize one or more DNS resolvers 104 to resolve hostnames for devices connected to the network 106 into network addresses, such as IP addresses. Accordingly, each DNS resolver 104 may correspond to a DNS server that serves DNS information to one or more user computing devices 102. For example, each DNS resolver 104 may correspond to a DNS server provided by an ISP of one or more users, a private DNS server, or a public DNS server. The detailed operation of DNS servers is well known within the art, and therefore will not be described in detail herein.

In order to resolve hostnames corresponding to the content delivery system, each DNS resolver 104 may communicate with a load balancing DNS server 112 within the content delivery system 110. DNS servers 112 can be operated on behalf of the content delivery system 110, and configured or otherwise operable to resolve hostnames of the content delivery system 110 into a network address of a corresponding POP 114. Illustratively, each DNS server can 112 be configured, on request from a DNS resolver 104 to resolve a specific hostname, to determine a POP 114 that should serve the DNS resolver 104 (or user computing devices 102 associated with the DNS resolver 104) and to return an IP address of the determined POP 114 to the DNS resolver 104. Thereafter, the DNS resolver 104 can return the IP address of the determined POP 114 to a requesting user computing device 102, which the user computing device 102 may use to contact the content delivery system 110 to retrieve content. In order to determine which POP 114 address into which to resolve a hostname request, each load balancer 112 may utilize capacity-independent criteria, such as network distance or latency, as well as capacity-dependent criteria, such as the current demand load on each POP 114. Load balancing techniques are well known within the art, and therefore will not be described in detail herein.

On receiving an address of a POP 114, a user computing device 102 may communicate with the POP 114 to retrieve content from the content delivery service 110. Accordingly, each POP 114 may include one or more data stores configured to store content available from the content delivery system 110. Moreover, each POP 114 may include one or more computing devices configured to receive requests from user computing devices 102 and return requested content.

The content delivery system 110 of FIG. 1 can further include a demand analysis service 116 configured to determine capacity-independent demand for individual POPs 114 within the content delivery system 110. In accordance with aspects of the present disclosure, the demand analysis service 116 may interact with the DNS servers 112 and POPs 114 in order to determine a demand load of each user computing device 102 (or collections of user computing devices 102). Further, the demand analysis service 116 can analyze requests transmitted to the DNS servers 112 and the POPs 114 in order to determine associations between the user computing devices 102 and DNS resolvers 104. Thereafter, the demand analysis service 116 can utilize such determined associations in order to attribute demand load of the user computing devices 104 to the DNS resolvers 104. Still further, the demand analysis service 116 can determine a POP 114 that would be associated with each DNS resolver 104, absent capacity restraints. Thus, the demand analysis service can aggregate demand loads attributed to each of the DNS resolvers 104 associated with a given POP 114 in order to determine a capacity-independent demand load for the POP 114. Further detail regarding calculation of capacity-independent demand load is provided below.

It will be appreciated by those skilled in the art that the content delivery system 110 may have fewer or greater components than are illustrated in FIG. 1. In addition, the content delivery system 110 could include various web services and/or peer-to-peer network configurations. Thus, the depiction of the content delivery system 110 should be taken as illustrative and not limiting to the present disclosure. For example, in some embodiments, components of the content delivery system 110, such as the demand analysis service 116, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the DNS servers 112, the POPs 114 and the demand analysis service 116 may be embodied in a plurality of components, each executing an instance of the respective DNS servers 112, POPs 114 and demand analysis service 116. A server or other computing component implementing any one of the DNS servers 112, POPs 114 and demand analysis service 116 may include a network interface, memory, processing unit, and computer readable medium drive, all of which may communicate which each other may way of a communication bus. The network interface may provide connectivity over the network 106 and/or other networks or computer systems. The processing unit may communicate to and from memory containing program instructions that the processing unit executes in order to operate the respective DNS servers 112, POPs 114 and demand analysis service 116. The memory may generally include RAM, ROM, other persistent and auxiliary memory, and/or any non-transitory computer-readable media.

Figure 2:
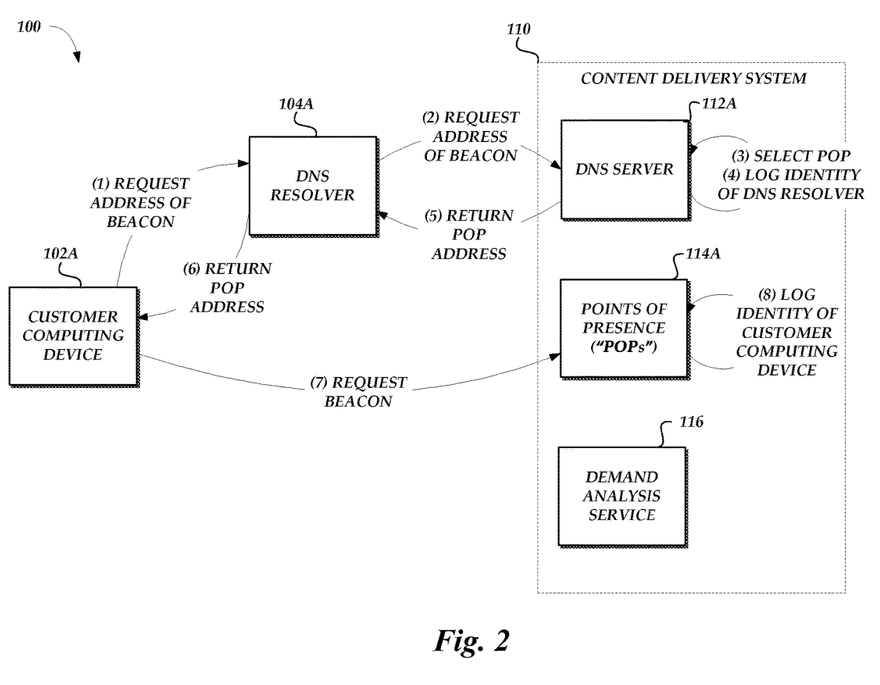
FIG. 2 is a block diagram depicting the use of a web beacon by the content delivery system 110 of FIG. 1 to determine relationships between user computing devices and DNS resolvers.

FIG. 2 illustrates an interaction for determining associations between a user computing device 102A and a DNS resolver 104A. As described in more detail below, associations between user computing devices 102 and DNS resolvers 104 may utilized to determine additional information used by the demand analysis service 116. For example, associations between user computing devices 102 and DNS resolvers 104 can be utilized to determine an average expected latency to attribute to a DNS resolver 104 (e.g., for the purposes of determining a POP 114 to serve the DNS resolver 104 and associated user computing devices 102).

More specifically, the interactions of FIG. 2 depict the use of a web beacon in order to gather information regarding a user computing device 102A and DNS resolver 104A. While FIG. 2 depicts a single interaction related to a web beacon, these interactions may be repeated to gather information regarding multiple user computing devices 102 or DNS resolvers 104, as well as information regarding the same user computing device 102 or DNS resolver 104 during different times.

While not shown within FIG. 2, it is assumed that the user computing device 102 has received a URL of a web beacon corresponding to the content delivery system 110. Illustratively, such a web beacon may have been included within an HTML page previously transmitted to the user computing device 102A. Thus, the interactions of FIG. 2 may occur simultaneously to loading an HTML page on the user computing device 102A. The interactions of FIG. 2 begin at (1), where the user computing device 102A attempts to resolve a hostname associated with the web beacon, as derived from the URL of the web beacon. Such a hostname may be unique or semi-unique to the web beacon, and therefore allow the content delivery system 110 to track interactions of the user computing device 102A related to the web beacon. Illustratively, the web beacon may be associated with the URL "beacon11.cdn.tld/myBeacon.gif." The hostname of the URL (e.g., "beacon1.cdn.tld") can be selected such that DNS requests for the web beacon are likely to be associated with the user computing device 102A, rather than other user computing devices 102 (not shown within FIG. 2).

At (1), the user computing device 102A transmits a request to resolve the hostname of the beacon to the DNS resolver 104A. The DNS resolver 104A may be selected according to the configuration of the user computing device 102A, or a subnetwork including user computing device 102. For example, the DNS resolver 104A may correspond to a DNS server provided by an ISP of the user computing device 102A. In response to reception of the request, the DNS resolver 104A, at (2), transmits the request to the DNS server 112 of the content delivery network 110. While two transmissions of the DNS resolution request are depicted here, embodiments of this application can allow any number of recursive DNS resolution requests between the initial request from the user computing device 102A and the resultant request to the DNS server 112A. In such an instance, the DNS resolver 104A may be considered the last DNS device to transmit the request for hostname resolution to the DNS server 112A.

After receiving the hostname resolution request, the DNS server 112A, at (3), selects an address of a POP 114 into which to resolve the hostname. Selection of a specific POP 114 can include criteria independent of the current demand load on the selected POP 114. Illustratively, selection of a POP 114 may be based at least in part, primarily, or exclusively on an expected or known latency between the DNS resolver and the selected POP 114. Capacity-independent criteria may further include any number of network-based criteria, such as network distance or bandwidth, as well as physical criteria, such as geographic distance between the selected POP 114 and the DNS resolver 104A. In some embodiments, capacity-independent selection may include the use of any number of route-selection protocols, which are well known within the art. Selection of a POP 114 may further include capacity-dependent criteria, which are based at least in part on a current demand load on the selected POP 114. Illustratively, the DNS server 112A may be configured to select a POP 114 with a current demand load lower than a specific threshold amount (e.g., as an absolute number of requests per second or a percentage of the total requests per second the POP 114 is capable of handling). In some instances, both capacity-independent and capacity-dependent criteria may be utilized to select a POP 114. For example, the DNS server 112A may be configured to select a POP 114 with the closest network distance to the DNS resolver 104A, so long as the current demand load on that POP 114 does not exceed a threshold amount. In the instance that the demand load on the nearest POP 114 does exceed a threshold amount, the DNS server 112A may be configured to resolve the requested hostname into an alternative POP 114. As discussed below, resolution of requests into addresses of alternative POPs 114 may skew demand load forecasting at the alternative POPs, by making demand for the alternative POP appear higher than it would be, absent capacity restraints.

Still further, resolution of a hostname request at the DNS server 114 may be based at least in part on the hostname requested. As noted above, in the example of FIG. 2, the requested hostname corresponds to a web beacon. Because the hostname corresponding to the beacon may be unique or semi-unique, the content delivery system 110 may resolve the hostname into an address of a predetermined POP 114. By utilizing predetermined POPs, the content delivery system 110 may generate statistical data regarding the connections between the DNS resolver 104A, the user computing device 102A, and the predetermined POP 114. For example, an operator or administrator of the content delivery system 110 may configure the DNS server 112A to resolve the requested hostname into a distant POP 114, in order to monitor latency between the distance POP 114 and the user computing device 102A. In the example of FIG. 2, it is assumed that the DNS server 112A resolves the requested hostname into the address of POP 114A. In addition, the DNS server 112A, at (4) records a log of such resolution, for later use by the demand analysis service 116, as will be described below. Such a log may be stored within the DNS server 112A or within an alternative data store of the content delivery system 110 (not shown within FIG. 2). In some embodiments, such a log may be transmitted to the demand analysis service 116 without being stored on the DNS server 112A.

After resolution, the DNS server 14 transmits a network address of the selected POP 114 to the DNS resolver 104A, at (5). The network address can then be recursively returned to the user computing device 102A, as shown in FIG. 2 at (6). Thereafter, the user computing device 102A can utilize the returned network address to communicate with the POP 114A. Specifically, at (7), the user computing device 102A can transmit a request for the web beacon to the POP 114A. While not shown within FIG. 2, the POP 114A may thereafter return the requested beacon to the user computing device 102A, where it may be included by the user computing device 102A, for example, within a rendered HTML document. In addition, at (8), the POP 114A can log the identity of the user computing device 102A, as well as other information regarding communication with the user computing device 102A, such as latency between the POP 114A and the user computing device 102A, for subsequent use by the demand analysis service 116. While logging of such information is described herein as subsequent to the previously discussed interactions, any information regarding interaction of the user computing device 102 with the content delivery system 110 can be logged for subsequent information retrieval. For example, an identity of the user computing device 102A or latency information regarding communication with the user computing device 102A may be recorded based on interactions with content delivery system 110 prior to receiving the URL of the web beacon (e.g., during transmission of an HTML document including the web beacon).

Though an individual set of interactions is described above with respect to FIG. 2A, embodiments of the present disclosure may utilize a plurality of transactions to generate information regarding a wide variety of user computing devices 102A and DNS resolvers 104A. In one embodiment, the interactions of FIG. 2A may be repeated for a statistically significant portion of all user computing devices 102A interacting with the content delivery system 110. For example, the interactions of FIG. 2A may be repeated for a specific percentage (e.g., 2%) of user computing devices 102, for user computing devices 102A within a specified number of geographic areas, or a combination thereof As will be described below, the demand analysis service 116 can thereafter analyze data retrieved from the user computing devices 102A and DNS resolvers 104A to generate aggregate statistical data. In one embodiment, such aggregate statistical data may include a set of determined relationships between individual user computing devices 102 and individual DNS resolvers 104. Each such relationship may reflect that, when attempting to retrieve a web beacon or other data from the content delivery system 110, an individual user computing device 102A transmitted a domain resolution request through a corresponding DNS resolver 104. Because each user computing device 102 may utilize different DNS resolvers 104 at different points in time (e.g., based on the configuration of the user computing device 102, the ISP of the user computing device 102, or other network conditions between the user computing device 102 and the content delivery system 110), each user computing device 102A may have relationships with a plurality of DNS resolvers 104. Similarly, each DNS resolver 104 may service multiple user computing devices 102. Therefore, relationships between user computing devices 102 and DNS resolvers 104 may be described as many-to-many. One table of observed relationships between user computing devices 102 and DNS resolvers 104 is shown below as TABLE 1.

TABLE 1

| User Computing Device to DNS Resolver Mapping | | DNS Resolver | | | | |
|---|---|---|---|---|---|---|
| | | V | W | X | Y | Z |
| User Computing Device | A | 2 | 8 | 0 | 0 | 0 |
| | B | 0 | 10 | 0 | 0 | 0 |
| | C | 0 | 1 | 8 | 1 | 0 |
| | D | 0 | 0 | 0 | 4 | 6 |
| | E | 0 | 0 | 0 | 1 | 0 |

TABLE 1 depicts the observed relationships among user computing devices A-E (e.g., corresponding to user computing devices 102 of FIG. 1) and DNS resolvers V-Z (e.g., corresponding to DNS resolvers 104 of FIG. 1). Specifically, TABLE 1 reflects that user computing device A interacted with DNS resolver V twice, DNS resolver W eight times, and did not interact with DNS resolvers X through Z. Similarly, TABLE 1 reflects that user computing device D interacted with DNS resolver Y four times, DNS resolver Z six times, and not with the remaining DNS resolvers. Each entry within TABLE 1 can reflect a single interaction of a user computing device and DNS resolver with the content delivery system 110. For example, each entry can reflect an observed DNS request from a DNS resolver to resolve a hostname of a web beacon, and subsequent request from a user computing device to retrieve the web beacon, as discussed in more detail above with respect to FIG. 2. For simplicity, the data with TABLE 1 is small with respect to number of user computing devices, DNS resolvers, and entries shown. However, the content delivery system 110 may generate a similar table for any number of user computing devices, DNS resolvers, and entries. In embodiments where the content delivery system 110 represents a continental or global delivery system, thousands, hundreds or thousands, or millions of user computing devices, DNS resolvers, or entries could be included within TABLE 1. Moreover, each of the user computing devices shown within TABLE 1 may be reflective of a single computing device, or a collection of computing devices. Illustratively, such collections of computing devices can be determined based on network topology (e.g., as within the same subnetwork) or expected geographical location (e.g., as determined using a variety of known IP geolocation techniques). Where the rows of TABLE 1 represent collections of computing devices, individual data points of TABLE 1 may represent monitored interactions of individual computing devices within a collection with a given DNS resolver. Because actions of individual computing devices can then be attributed to groups of computing devices, the content delivery system 110 may not be required to collect interaction information for each user computing device served.

In addition, the content delivery system 110 can utilize interactions similar to those described above with respect to FIG. 2 to determine latency information or other network information for each DNS resolver. Such information can thereafter be utilized to determine a POP that should be associated with each DNS resolver, absent capacity constraints. In one embodiment, latency or network information may be determined based at least in part on network communications between a DNS resolver and the content delivery system 110 (e.g., based on DNS resolution requests received from each DNS resolver). In another embodiment, latency or other network information can be attributed to a DNS resolver based on interactions between the content delivery system 110 and user computing devices associated with the DNS resolver (as reflected in TABLE 1, above). For example, the latency of communication between the content delivery system 110 and all user computing devices associated with a specific DNS resolver may be averaged in order to assign a determined latency to the DNS resolver. One example of latency assigned to DNS resolvers is shown below as TABLE 2.

TABLE 2

| POP to DNS Resolver Mapping | | DNS Resolver | | | | |
|---|---|---|---|---|---|---|
| | | V | W | X | Y | Z |
| POP | A | 38.5 ms | 27.1 ms | 50 ms | 75 ms | 50 ms |
| | B | 17.8 ms | 31.4 ms | 15 ms | 65 ms | 70 ms |
| | C | 52 ms | 47 ms | 72 ms | 22 ms | 25 ms |

TABLE 2 depicts an assigned latency of communication between a set of DNS resolvers V-Z and a set of POPs A-C. For example, TABLE 2 reflects that communications of POP A are assigned a latency of 38.5 ms with DNS resolver V, 27.1 ms with DNS resolver W, etc. These latencies may be based exclusively or at least in part on communications between an individual DNS resolver and individual POP. Further, these latencies may be based exclusively or at least in part on communications between individual POPs and user computing devices with known relationships to individual DNS resolvers. While latency value is used herein for illustrative purposes, additional capacity-independent criteria may also be utilized to measure interactions between a POP and a DNS resolver. For example, each DNS resolver may be assessed based on network distance or bandwidth between the resolver (or user computing devices associated with the resolver) and the content delivery system 110.

Figure 3A:
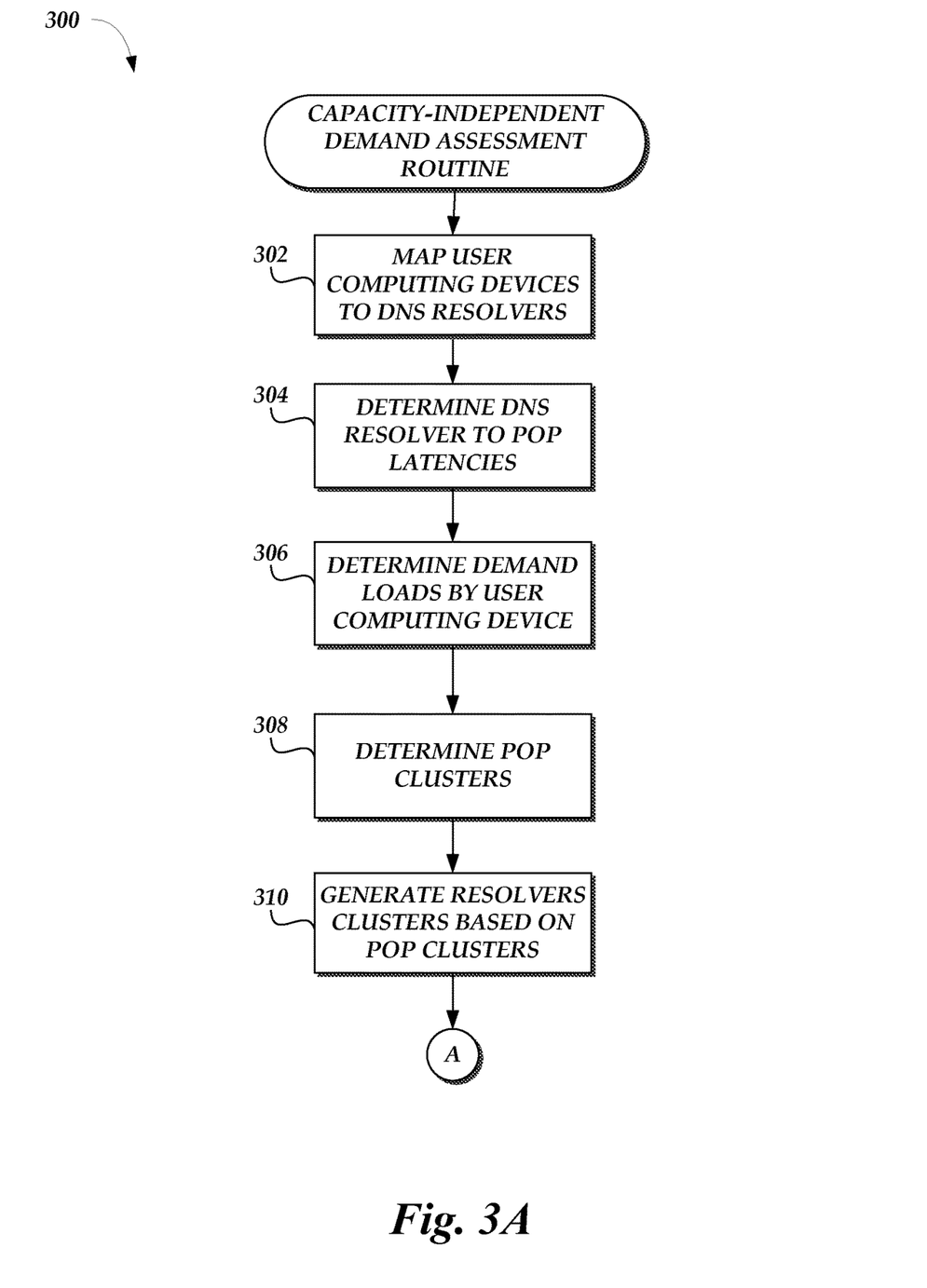
FIGS. 3A and 3B depict a flow-diagram of a routine to determine demand for points-of-presence independent of each point-of-presence's service capacity, in accordance with aspects of the present disclosure.
Figure 3B:
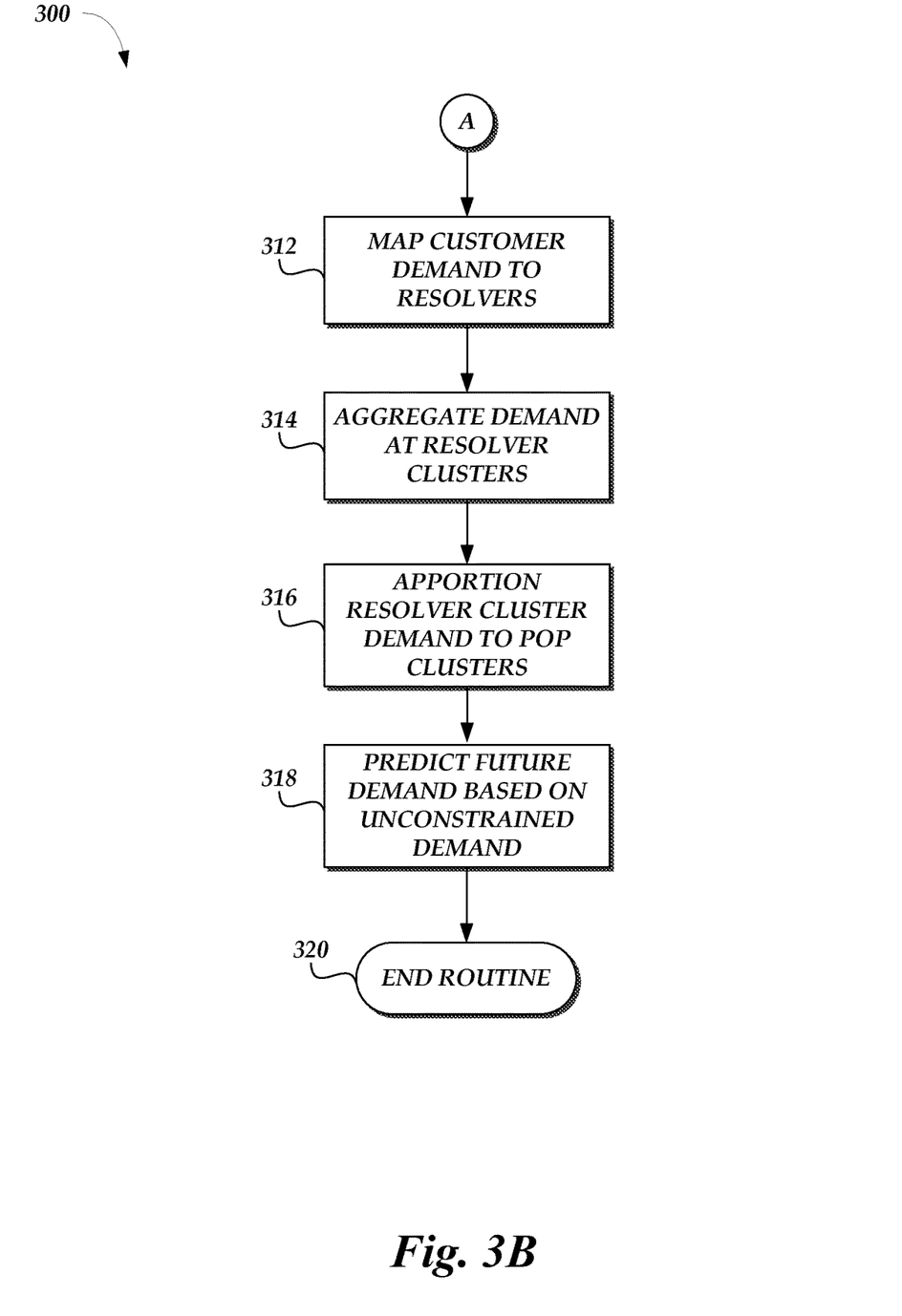

With reference to FIGS. 3A and 3B, one illustrative routine 300 for assessing capacity-independent demand for POPs, such as POPs 114 of FIG. 1, is described. The routine 300 may be carried out, for example, by the demand analysis service 116 of FIG. 1, either alone or in conjunction with other components of the content delivery system 110. The routine 300 is depicted within two figures merely for ease of depiction.

The routine 300 begins at block 302, where the demand analysis service 116 maps user computing devices 102 to DNS resolvers 104. As discussed above, a user computing device 102 may be mapped to a DNS resolver 104 based on monitored interactions of the user computing device 102 and the DNS resolver 104 with the content delivery system 110. For example, a user computing device 102 may be mapped to a DNS resolver 104 based on delivery of a web beacon to the user computing device 102 and a subsequent request from the DNS resolver 104 to resolve a hostname associated with the web beacon. As a further example, a user computing device 102 may be mapped to a DNS resolver 104 based on a known relationship between the DNS resolver 104 and similar user computing devices 102. Illustratively, where one or more user computing devices 102 within a subnetwork or geographical area have previously been mapped to a specific DNS resolver 104, other user computing devices 012 within that subnetwork or geographical area may also be mapped to the DNS resolver 104. One example of data mapping user computing devices to DNS resolvers 104 is shown above with respect to TABLE 1.

At block 304, the demand analysis service 116 determines a set of DNS resolver 104 to POP 114 latencies. As discussed above, these latencies may be determined based at least in part on interactions between the POPs 114 and the DNS resolvers 104. Additionally or alternatively, these latencies may be determined based on interactions between the POPs 114 and user computing devices 102 with known relationships to a specific DNS resolver 104. For example, a determined latency between a POP 114 and a given DNS resolver 104 may be calculated as an average of latencies observed between the POP 114 and each user computing device 102 mapped to the DNS resolver 104. One example of calculated latencies between POPs 114 and DNS resolvers 102 is shown above with respect to TABLE 2.

At block 306, the demand analysis service 116 determines a demand load attributable to each user computing device 102 or collection of user computing devices 102. In one embodiment, demand loads are reflective of an actual rate of demand (e.g., in requests per seconds) from individual user computing devices 102. Such rates may be determined, for example, by individual POPs 114, and thereafter reported to the demand analysis service 116. In other embodiments, demand rates may be reflective of historical or averaged demand from individual user computing devices 102. One example of demand rates from a set of user computing devices 102 is shown below in TABLE 3.

TABLE 3

| Demand Load per User Computing Device, in Requests per Second | | Requests per second |
|---|---|---|
| User Computing Device | A | 100 |
| | B | 10 |
| | C | 20 |
| | D | 40 |
| | E | 200 |

TABLE 3 reflects an aggregate demand level for each user computing device A-E. Each row within TABLE 3 can represent an aggregate of demand from the given user computing device A-E, without regard to the individual POP 114 that served the user computing device A-E (which, as discussed above, may have been selected based on capacity-dependent criteria). While shown as a single user computing device, each row within TABLE 3 may reflect collections of user computing devices 102, such as user computing devices 102 within the same subnetwork or geographical location. A relatively small amount of data is shown within TABLE 3 for the purposes of illustration. In practice, demand loads for user computing devices 102 or collections of user computing devices 102 may rise into the thousands, hundreds of thousands or millions of requests per second. Moreover, demand loads for any number of user computing devices 102 could be reflected within TABLE 3.

At block 308, the demand analysis service 116 determines clusters of POPs 114 for the purposes of assessing capacity-independent demand to each POP cluster. Illustratively, POPs 114 may be clustered based on geographical area, such that calculations regarding POPs 114 intended to serve a specific region (e.g., the east coast of the U.S.) may be aggregated, to determine an aggregate demand load for each POP 114 in the region. POPs 114 can be clustered based on a set of POP 114 to DNS resolver 104 latencies, as discussed above with respect to block 304. Therefore, POPs 114 with similar latencies across a number of DNS resolvers 104 may be clustered together. Any number of clustering algorithms may be used to cluster the POPs 114. In one embodiment, hierarchical agglomerative clustering is used to cluster POPs 114 based on their DNS resolver 104 latencies. In such embodiments, Ward's method can be applied to such hierarchical cluster analysis in order to generate the POP clusters. In other embodiments, additional or alternative clustering methods, such as K-means clustering, affinity propagation, spectral clustering, or spectral co-clustering can be utilized to generate POP clusters. Each of the above-noted clustering algorithms and criteria are well known within the art, and therefore will not be discussed in detail herein. One illustrative table depicting results of cluster analysis on POPs 114 is displayed below within TABLE 4.

TABLE 4

| POP Cluster | Included POPs |
|---|---|
| POP Cluster 1 | POP A |
| | POP B |
| POP Cluster 2 | POP C |

Illustratively, TABLE 4 may be generated based on execution of a cluster analysis algorithm on the data of TABLE 2, above. As shown in TABLE 4, the results of such analysis show that POPs A and B of TABLE 2 form a single cluster ("Cluster 1"), while POP C of TABLE 2 forms a separate cluster ("Cluster 2"). This table therefore reflects the similarity of latencies between DNS resolvers and POPs A and B, and the relative dissimilarity in latencies between DNS resolvers and POP C. As in the previous tables, the data within TABLE 4 is shown within simplified form, and in practice may include any number of POPs and POP clusters.

At block 310, the demand analysis service 116 can utilize the previously determined POP clusters to determine corresponding clusters of DNS resolvers. Specifically, each DNS resolver cluster can include a set of DNS resolvers that would, in the absence of capacity constraints, be served by a POP within a corresponding cluster. Thus, generation of DNS resolver clusters can include, for each POP cluster, determining a set of DNS resolvers that should be served by the POPs within the POP cluster. As an illustrative example utilizing the tables above, the demand analysis service 116 can determine a DNS resolver cluster corresponding to POP Cluster 1 (of TABLE 4) by determining a set of DNS resolvers that should, absent capacity constraints, be served by POPs A and B. Similarly, the demand analysis service 116 can determine a DNS resolver cluster corresponding to POP Cluster 2 (of TABLE 4) by determining a set of DNS resolvers that should, absent capacity constraints, be served by POP C. As noted above, any capacity-independent criteria can be used to determine a POP to service a given DNS resolver. In one embodiment, POPs can be assigned to service DNS resolvers based on latency. For example, based on the data of TABLE 2, above, POP A can be expected to serve requests associated with DNS resolver W, as POP A is associated with a lower latency to DNS resolver W than other available POPs. Similarly, POP B can be expected to serve requests associated with DNS resolver X. A listing of POPs and preferred DNS resolvers based on latency is shown below as TABLE 5.

TABLE 5

| Resolver to POP Mapping | DNS Resolver | | | | |
|---|---|---|---|---|---|
| | V | W | X | Y | Z |
| Preferred POP | POP B | POP A | POP B | POP C | POP C |

In one embodiment, the demand analysis service 116 can determine a preferred POP for each DNS resolver, and then utilize the listing of preferred POPs to determine DNS resolver clusters corresponding to previously determined POP clusters. For example, where POP A and POP B form a single cluster, DNS resolvers V, W and X (each utilizing either POP A or POP B as a preferred POP) would form a corresponding DNS resolver cluster. A listing of POP clusters and corresponding DNS resolver clusters, utilizing the information from TABLES 1-5 above is shown below as TABLE 6.

TABLE 6

| POP Cluster | DNS Resolvers Clusters |
|---|---|
| POP Cluster 1 | Resolver Cluster 1 |
| (POPS A and B) | (Resolvers V, W, and X) |
| POP Cluster 2 | Resolver Cluster 2 |
| (POP C) | (Resolvers Y and Z) |

After determining a set of DNS resolver clusters, the routine 300 continues on FIG. 3B at block 312. Specifically, at block 312, the demand analysis service 116 can utilize previously determined information regarding user demand loads (e.g., as shown within TABLE 3, above), as well as the previously generated mapping of user computing devices 102 to DNS resolvers 104, to attribute user demands to individual DNS resolvers 104 or clusters of DNS resolvers 104. Specifically, the demand analysis service 116 can generate a demand load from each user computing device 102 to attribute to each DNS resolver 104 by dividing the demand load of each user computing device 102 among each DNS resolver 104 mapped to the user computing device 102. One illustrative equation for attributing demand loads is $$(UDi \to Rj : Lij) = \frac{(UDi : Li) * (UDi \to Rj : w_{ij})}{\sum_j (UDi \to Rj : w_{ij})}$$

Wherein:

UDi represents a given user computing device 102;

Rj represents a given DNS resolver 104;

Li represents the demand load attributable to the user computing device 102 (e.g., as shown within TABLE 3);

$w_{ij}$ represents the weight or proportion of requests from the user computing device 102 associated with the DNS resolver 104; and Lij represents the demand load of the user computing device 102 attributable to the DNS resolver 104.

For example, based on the information of TABLE 1 and TABLE 3, above, the demand analysis service 116 can attribute user demand loads as shown in TABLE 7, below.

TABLE 7

| Demand Load per Resolver, in Requests Per Second | | DNS Resolver | | | | |
|---|---|---|---|---|---|---|
| | | V | W | X | Y | Z |
| User Computing Device | A | 20 | 80 | 0 | 0 | 0 |
| | B | 5 | 5 | 0 | 0 | 0 |
| | C | 0 | 2 | 16 | 2 | 0 |
| | D | 0 | 0 | 0 | 16 | 24 |
| | E | 0 | 0 | 0 | 200 | 0 |

As shown in TABLE 7, for user computing device A, 20 requests per second are attributable to DNS resolver V, while 80 requests per second are attributable to DNS resolver W. This reflects an apportionment of the 100 requests per second demand load of user computing device A between DNS resolvers V and W, as weighted according to the determined relationship between user computing device A and DNS resolvers V-Z shown in TABLE 1.

After determining the demand loads attributable to each DNS resolver, the demand analysis service 116 can, at block 314, aggregate the demand loads for each DNS resolver cluster, to determine an aggregate demand load of the cluster. One equation for aggregating the demand load is:

$$L(k) = \sum_{j:Rj \in RC(k)} (UDi \to Rj : Lij)$$

Wherein:

UDi, Rj, and Lij are defined as discussed above;

RC(k) represents a given DNS resolver cluster (e.g., as shown within TABLE 6, above); and L(k) represents a determined demand load for the resolver cluster.

For example, based on the information of TABLE 6 and TABLE 7, above, the demand analysis service 116 can determine an aggregate demand loads of 128 requests per second for DNS resolver cluster 1, and a demand of 242 requests per second for DNS resolver cluster 2. These aggregate demand represent the sum of the demand loads attributable to each DNS resolver within a given DNS resolver cluster.

At block 316, the demand analysis service 116 can apportion the demand loads of each DNS resolver cluster to a corresponding POP cluster (as determined, e.g., based on TABLE 6, above) to determine a capacity-independent demand load for the POP cluster. For example, where the aggregate demand load of DNS resolver cluster 1 is 128 requests per second, that demand load is apportioned to POP Cluster 1 as the capacity-independent demand load for the POP cluster. Because the relationships between DNS resolver clusters and POP clusters are determined based on capacity-independent criteria, the demand loads determined at block 316 represent capacity-independent demand loads for the DNS resolver clusters.

Thus, the demand loads determined at block 316 can be utilized, at block 318, to forecast future demand for each POP cluster in a more accurate manner than actual demand rates on the POP cluster, which may be skewed due to capacity restraints. Demand forecasting based on historical demand data is well known within the art, and therefore will not be discussed in detail herein. The routine 300 may thereafter end at block 320.

One skilled in the art will appreciate that the routine 300 may include fewer or more interactions than described above. For example, in one embodiment, implementations of the routine 300 may omit blocks 308 and 310, related to clustering POPs and DNS resolvers, respectively. In such embodiments, capacity-independent demand may be determined for individual POPs, rather than clusters of such POPs. In other embodiments, implementations of the routine 300 may include generation of any of the data described above with respect to TABLES 1-7. For example, the routine 300 may include transmission and monitoring of web beacons to a number of user computing devices 102, as described in more detail above with respect to FIG. 2. Accordingly, the interactions of routine 300 are intended to be illustrative in nature, and not limiting.

Figure 4:
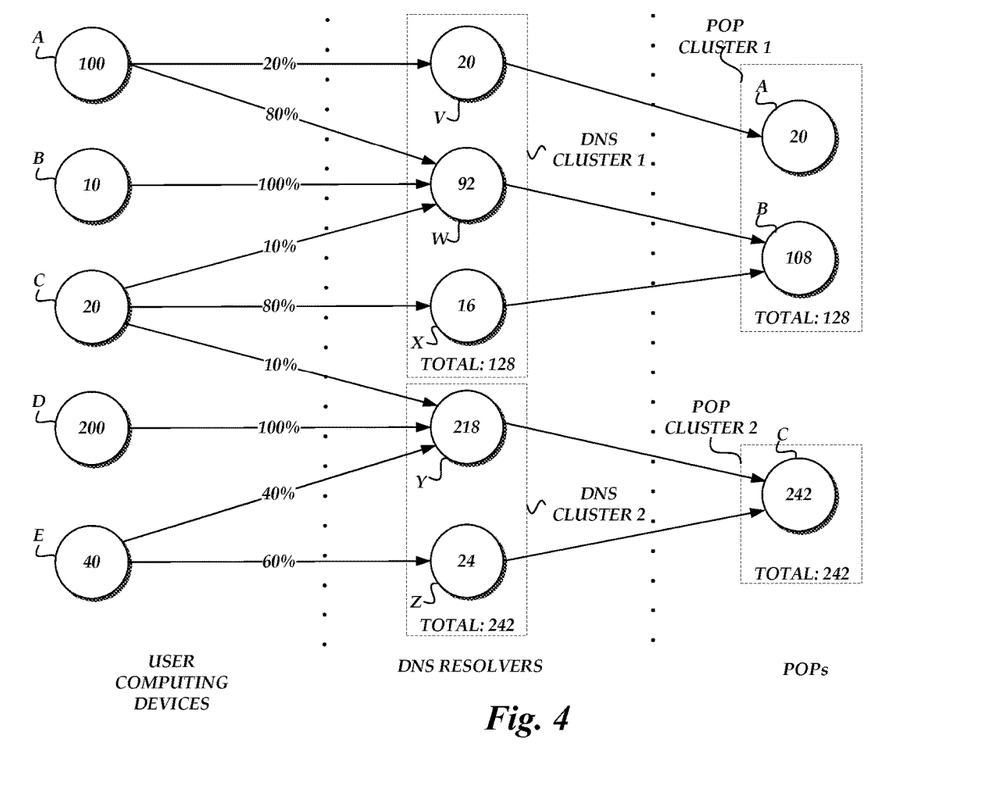
FIG. 4 is an illustrative visualization or graphical representation of demand levels for points-of-presence determined independent of each point-of-presence's service capacity.

With reference to FIG. 4, one illustrative visualization or graphical representation of demand levels for POPs 114 determined independent of each POPs 114 demand capacity will be described. Specifically, FIG. 4 depicts an illustrative logical topology of the demand levels of five user computing devices A-E as attributed to DNS resolvers V-Z and POPs A-C. Within FIG. 4, each user computing device A-E may correspond to a user computing devices 102 of FIG. 1. While individual user computing devices are shown within FIG. 4, in some instances each user computing device A-E may represent a set of computing devices 102 (e.g., user computing devices 102 within the same or similar subnetworks, within a similar geographical region, etc.). Similarly, each DNS resolver V-Z can correspond to a DNS resolver 104 of FIG. 1, and each POP A-C can correspond to a POP 114 of FIG. 1.

As shown in FIG. 4, each user computing device A-E is associated with a given demand load corresponding to the demand load shown above in TABLE 3. Further, each user computing device A-E has a weighted relationship with one or more DNS resolvers V-W, as shown in FIG. 4 by a percentage. The weighted relationships of FIG. 4 reflect the data shown within TABLE 1, above, when displayed in percentile format. Based on the demand loads of each user computing device A-E and the weighted relationships, the demand load of each DNS resolver V-Z can be calculated. For example, the demand load of the DNS resolver V within FIG. 4 is shown to be 20 requests per second, reflecting that 20% of the 100 request per second Similarly, the demand load of DNS resolver W is shown to be 92 requests per second, reflecting a summation of 80% of the demand load of user computing device A, 100% of the demand load of user computing device B, and 10% of the demand load of user computing device C.

FIG. 4 further depicts a set of relationships between individual DNS resolvers V-Z and POPs A-C. Specifically, within FIG. 4, the connections between DNS resolvers V-Z and POPs A-C represent, for each DNS resolver, a POP preferred to service clients of the DNS resolver absent capacity constraints. In one embodiment, preferred POP and DNS resolver pairs can be selected based on the latency between each POP and DNS resolver (e.g., to minimize such latency). In other embodiments, preferred POP and DNS resolver pairs can be selected based on additional or alternative capacity-independent criteria, such as geographic location or network distance. In the illustration of FIG. 4, the relationships between DNS resolvers V-Z and POPs A-C reflect the data displayed within TABLE 5, above. By virtue of the relationships between DNS resolvers POPs, each POP A-C of FIG. 4 may be attributed the demand load of corresponding DNS resolvers. Because such attribution is dependent on a preferred POP, rather than a POP that actually served users of each DNS resolver, the attributed demand load is reflective of a capacity-independent demand on each POP. For example, POP A is shown within FIG. 4 to have a capacity-independent demand load of 20 requests per second. Similarly, POP A is shown to have a capacity-independent demand load of 108 requests per second, while POP C is shown to have a capacity independent demand load of 242 requests per second. Thus, the relationships among components of FIG. 4 show how demand of user computing devices A-E can be attributed to POPs A-C as a capacity-independent demand load.

In addition, FIG. 4 further depicts the results of clustering analysis conducted on the POPS A-C and the DNS resolvers V-Z. Specifically, POPs A and B are included within POP Cluster 1, while POP C is included within POP Cluster 2. As noted above, these clusters can be generated based on analysis of various latencies (or other metrics, such as bandwidth, network distance, or any combination thereof) according to a clustering algorithm, such as a hierarchical agglomerative clustering algorithm. Each POP Cluster can therefore represent a specific grouping of POPs, such as POPs serving a given geographical area. Thus, the individual POPs within a POP cluster may be combined in order to determine a total aggregate demand level for the POP Cluster. As shown in FIG. 1, POP Cluster 1 is associated with an aggregate demand of 128 requests per second, while POP Cluster 2 is associated with an aggregate demand of 242 requests per second. FIG. 4 further includes a representation of DNS resolver clusters corresponding to the POP Clusters. Specifically, each DNS resolver cluster comprises a set of DNS resolvers associated with a specific POP Cluster. Thus, DNS resolver cluster 1 includes DNS resolvers V-W (by virtue of their association with POPs A-B of POP Cluster 1), while DNS resolver cluster 2 includes DNS resolvers Y and Z (by virtue of their association with POP C of POP Cluster 2. As shown in FIG. 4, the total demand load for each DNS Resolver Cluster is equivalent to the demand load of the corresponding POP Cluster.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A content delivery system comprising:
a plurality of points of presence ("POPs"), each POP comprising one or more computing devices configured to retrieve and transmit content in response to requests from a plurality of user computing devices;
a plurality of domain name system ("DNS") servers, each DNS server configured to receive, from DNS resolvers, requests to resolve a hostname of the content delivery system into a network address of a POP of the plurality of POPs; and
one or more processors implementing a demand analysis service, the one or more processors configured with specific computer-executable instructions to:
monitor interactions of the plurality of user computing devices and the DNS resolvers with the content delivery system;
determine, based at least in part on the monitored interactions, a mapping between a first DNS resolver and a subset of user computing devices from the plurality of user computing devices, that are associated with the first DNS resolver;
identify, from the plurality of POPs, a preferred POP for the first DNS resolver, wherein the preferred POP is identified independent of the capacity of POPs within the plurality of POPs to service additional user requests;
aggregate historical data of requests received across the plurality of POPs from the subset of user computing devices, from the plurality of user computing devices, that are associated with the first DNS resolver; and
store the aggregate historical data of requests received across the plurality of POPs from the subset of user computing devices, from the plurality of user computing devices, that are associated with the first DNS resolver as capacity-independent demand data for the preferred POP.

2. The content delivery system of claim 1, wherein the one or more processors are further configured to:
identify one or more additional DNS resolvers associated with the preferred POP, wherein the one or more additional DNS resolvers are associated with the preferred POP independent of the capacity of POP to service additional user requests; and determine, based at least in part on the monitored interactions, an additional subset of user computing devices, from the plurality of user computing devices, that are associated with the one or more additional DNS resolvers; and wherein the aggregate historical data of requests includes historical data of requests received at the plurality of POPs from the additional subset of user computing devices.

3. The content delivery system of claim 1, wherein the aggregate historical data of requests includes an average number of requests per second transmitted to the plurality of POPs from the subset of user computing devices that are associated with the first DNS resolver.

4. The content delivery system of claim 1, wherein the one or more processors are further configured to:

collect interaction information between the plurality of POPs and the DNS resolvers according to at least one network metric; and execute at least one clustering algorithm on the collected interaction information in order to identify at least one cluster of POPs including the preferred POP.

5. The content delivery system of claim 4, wherein the aggregate historical data of requests is stored as capacity-independent demand data for the cluster of POPs.

6. The content delivery system of claim 4, wherein the one or more processors are further configured to determine a cluster of DNS resolvers based at least in part on the identified cluster of POPs.

7. The content delivery system of claim 6, wherein the capacity-independent demand data for the cluster of POPs further includes aggregate historical data of requests received at the plurality of POPs from additional user computing devices, from the plurality of user computing devices, that are associated with DNS resolvers of the determined cluster of DNS resolvers.

8. A computer-implemented method to assess capacity-independent demand data for at least one point of presence ("POP") of a plurality of POPs associated with a distributed communications system, the computer-implemented method comprising:

monitoring interactions of a plurality of user computing devices and DNS resolvers with the distributed communications system, wherein the DNS resolvers are configured to request resolution of hostnames associated with the distributed communications system on behalf of the plurality of user computing devices;

determining, based at least in part on the monitored interactions, a subset of user computing devices, from the plurality of user computing devices, that are associated with a first DNS resolver;

identifying, from the plurality of POPs, a preferred POP for the first DNS resolver, wherein the preferred POP is identified independent of a capacity of POPs within the plurality of POPs to service additional user requests;

aggregating information regarding requests received across the plurality of POPs from the subset of user computing devices, from the plurality of user computing devices, that are associated with the first DNS resolver; and storing the aggregate information regarding requests received across the plurality of POPs from the subset of user computing devices, from the plurality of user computing devices, that are associated with the first DNS resolver as capacity-independent demand information for the preferred POP.

9. The computer-implemented method of claim 8, wherein monitoring interactions of the plurality of user computing devices and DNS resolvers with the distributed communications system comprises:

transmitting a predetermined hostname to a first user computing device;

receiving a request from the first DNS resolver to resolve the predetermined hostname into a network address; and associating the first user computing device with the first DNS resolver.

10. The computer-implemented method of claim 9, wherein the predetermined hostname is included within a universal resource locator ("URL"), and wherein the URL corresponds to a web beacon.

11. The computer-implemented method of claim 10 further comprising receiving a request from the first user computing device for the web beacon, wherein associating the first user computing device with the first DNS resolver is based at least in part on reception of the request from the first user computing device for the web beacon.

12. The computer-implemented method of claim 10, wherein the URL is transmitted to the first user computing device from the distributed communication system within a hypertext markup language (HTML) document.

13. The computer-implemented method of claim 9 further comprising:

identifying one or more additional user computing devices based at least in part on the first user computing device; and associating the one or more additional user computing devices with the first DNS resolver.

14. The computer-implemented method of claim 9 further comprising determining a cluster of POPs including the preferred POP, wherein the cluster of POPs is determined based at least in part on executing a clustering algorithm on network information derived from the monitored interactions.

15. The computer-implemented method of claim 9, wherein the preferred POP is identified based on one or more network metrics assessed between the preferred POP and the first DNS resolver.

16. The computer-implemented method of claim 9, wherein the one or more network metrics include latency, hop count, bandwidth, packet loss, or path reliability.

17. Non-transitory computer-readable media comprising computer-executable instructions to assess capacity-independent demand data within a distributed communications system that, when executed by one or more processors, cause the processors to:

determine, based at least in part on interactions of a plurality of user computing devices and DNS resolvers with the distributed communications system, a subset of user computing devices, from the plurality of user computing devices, that are associated with a first DNS resolver;

identify a preferred point of presence ("POP") within the distributed communications system for the first DNS resolver, wherein the preferred POP is identified independent of a capacity of POPs within the distributed communications system to service additional user requests;

aggregate information regarding requests received across the POPs within the distributed communications system from the subset of user computing devices, from the plurality of user computing devices, that are associated with the first DNS resolver; and store the aggregate information regarding requests received across the POPs within the distributed communications system from the subset of user computing devices, from the plurality of user computing devices, that are associated with the first DNS resolver as capacity-independent demand information for the preferred POP.

18. The non-transitory computer-readable media of claim 17, wherein the computer-executable instructions further cause the processors to:

collect, according to at least one network metric, interaction information between the DNS resolvers and the POPs of the distributed communications system; and execute at least one clustering algorithm on the collected interaction information in order to identify at least one cluster of POPs including the preferred POP; and wherein the aggregate information of requests is stored as capacity-independent demand data for the cluster of POPs.

19. The non-transitory computer-readable media of claim 18, wherein at least one clustering algorithm includes at least one of hierarchical agglomerative clustering, K-means clustering, affinity propagation, spectral clustering, or spectral co-clustering.

20. The non-transitory computer-readable media of claim 18, wherein the computer-executable instructions further cause the processors to determine a cluster of DNS resolvers based at least in part on the identified cluster of POPs, and wherein the capacity-independent demand data for the cluster of POPs further includes aggregate historical data of request received across the POPs within the distributed communications system from additional user computing devices associated with the determined cluster of DNS resolvers.

* * * * *